M. R. BUCHANAN.
PRESSURE INDICATOR.
APPLICATION FILED MAR. 31, 1919.
1,341,542.
Patented May 25, 1920.
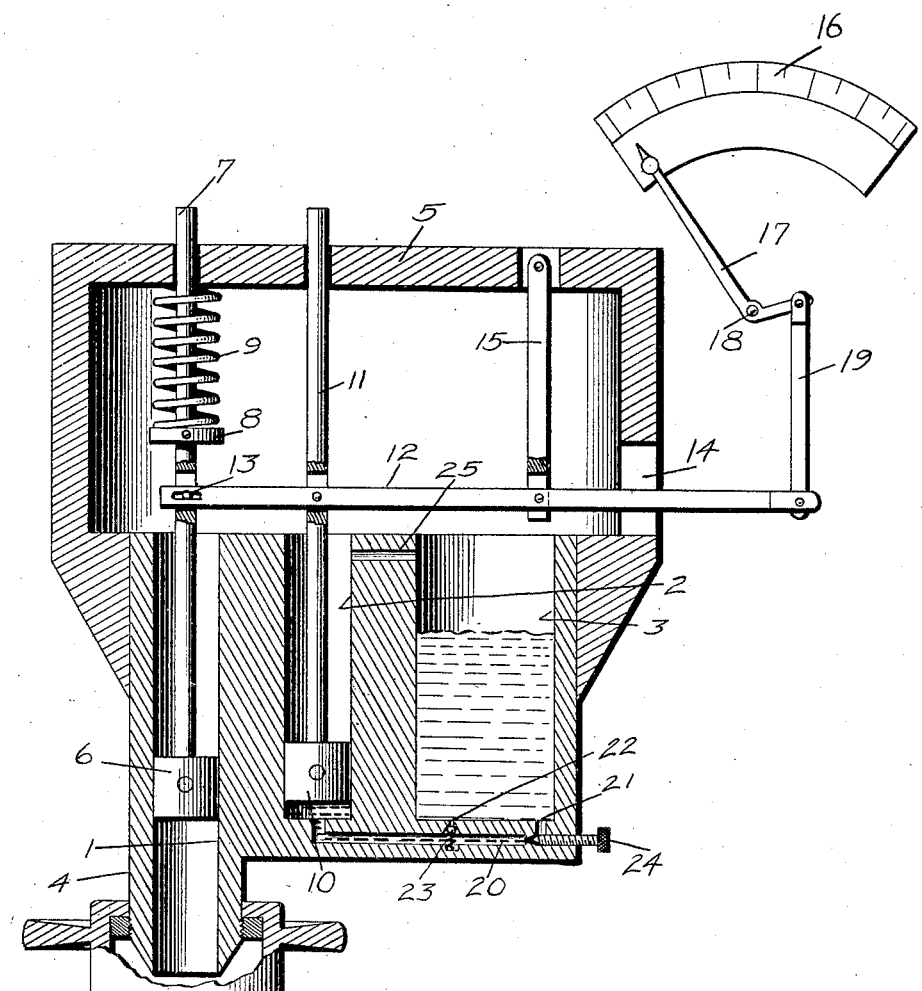
WITNESSES
INVENTOR
M. R. BUCHANAN,
BY
ATTORNEYS

UNITED STATES PATENT OFFICE.

MOSES RIDLEY BUCHANAN, OF SILVER CITY, NEW MEXICO.

PRESSURE-INDICATOR.

1,341,542.	Specification of Letters Patent.	Patented May 25, 1920.

Application filed March 31, 1919. Serial No. 286,297.

*To all whom it may concern:*

Be it known that I, MOSES R. BUCHANAN, a citizen of the United States, and a resident of Silver City, in the county of Grant and State of New Mexico, have invented certain new and useful Improvements in Pressure-Indicators, of which the following is a specification.

My invention is an improvement in pressure indicators, and has for its object to provide an indicator of the character specified especially adapted for indicating the mean effective pressure in the cylinder of an internal combustion engine and to indicate the load that each cylinder is carrying in multiple cylinder engines to permit the load to be evenly balanced between the cylinders of the said engine.

In the drawings is shown a sectional view of the improved indicator.

In the present embodiment of the invention a casing is provided, comprising cylinders 1, 2 and 3, and the casing has at the cylinder 1 a nipple 4 which may be connected with an internal combustion engine, preferably at a point about one-fourth the length from the firing end in order to avoid the extremely high pressure of compression.

The cylinders 1, 2 and 3 are all open at their outer ends, as shown, and the outer end of the casing is closed by a cap 5 which fits over the said outer end, as shown. A piston 6 is arranged in the cylinder 1 and a rod 7 is connected with the piston, the rod extending through a guide opening in the cap. This rod has a stop 8 fixed thereon, and a coil spring 9 is arranged between the stop and the cap, the spring acting normally to force the piston downward. A piston 10 is arranged in the cylinder 2 and this piston has a stem or rod 11 which also extends through a guide opening in the cap.

A lever 12 is pivoted to the stem 11, passing through an opening in the stem, and the lever passes also through an opening in the stem 7 and has a lost motion connection with the stem, as indicated at 13. The lever extends out through a lateral opening 14 in the cap and it is supported intermediate its ends by a link 15 which is pivoted at one end to the lever and at the other to an opening in the cap, as shown.

A suitable indicator, comprising a scale 16 and a pointer 17, is provided adjacent to the casing, and this pointer is an elbow lever, being pivoted at 18 at the junction of the two arms, one of which is the pointer coöperating with the scale. The pointer is pivoted to any fixed support. A link 19 connects the other arm with the outer end of the lever 12, the arrangement being such that when the piston 6 is moved outwardly the pointer will be moved along the scale from the zero toward the other end.

The cylinder 3 is a chamber or reservoir for liquid, as, for instance, oil, and a passage 20 leads from this chamber at the bottom thereof to the bottom of the cylinder 2. This passage 20 communicates with the cylinder 3 by ports 21 and 22, and a spring supported ball check valve 23 coöperates with the port 22, the spring acting normally to hold the ball in closed position. A needle valve 24 controls the port 21, and by means of the valve the extent of opening of the port may be regulated. Another port 25 is provided near the open ends of the cylinders 2 and 3.

In operation, on the working stroke of the engine to be tested, the piston 6 will be forced outward by the pressure and will swing the lever 12, carrying outward with it the piston 10, since this piston is connected with the lever. The oil in the chamber 3 will be drawn into the chamber 2, passing through the port 21 and by the check valve 23.

When there is a partial vacuum in the cylinder being tested, the piston 6 tends to move inward, but this movement is resisted and damped by the oil beneath the piston 10 which must be forced out of the chamber 2 before the piston 10 can descend and before the piston 6 can move inward. Hence the movement of the piston 6 is steadied and damped, the piston 10 and cylinder 2 acting as a dashpot for this purpose. In this manner the indicator 17 will be comparatively steady, indicating the effective mean pressure in the cylinder being tested. With a plurality of cylinders the load may be evenly balanced between the cylinders since the pressure in each may be obtained.

I claim:

1. A casing having a cylinder provided with means for connecting it with the engine cylinder to be tested, and having other cylinders closed at the ends adjacent to the connecting means and open at their other ends and arranged with their axes parallel with that of the first named cylinder, a piston in the first named cylinder, a piston in one of the other cylinders, the third cylinder being a reservoir for liquid, each of the pistons having a rod extending through the open end of the cylinder and having guided movement in the casing, a link depending from the top of the casing, a lever pivoted to the link, a connection between the lever and each of the piston rods, an indicator connected with the outer end of the lever, and a spring pressing the first named plunger toward the engine cylinder, said second named piston and the cylinder with which it coöperates being a dashpot, the cylinder having a restricted communication at its lower end with the third cylinder or reservoir.

2. A casing having a cylinder adapted for connection with the engine cylinder to be tested, and having other cylinders closed at their inner ends, and arranged with their axes parallel with that of the first named cylinder, a piston in the first named cylinder, a piston in one of the other cylinders, the third cylinder being a reservoir for liquid, a link depending from the outer end of the casing, a lever pivoted intermediate its ends to the link, said lever being connected at one end to both pistons, an indicator at the other end, and a spring normally pressing the first named piston toward the engine cylinder, said second named piston and the cylinder with which it coöperates being a dashpot, this cylinder having a restricted communication at its lower end with the third cylinder or reservoir.

MOSES RIDLEY BUCHANAN.